US012789406B2

(12) United States Patent
Grant

(10) Patent No.: US 12,789,406 B2
(45) Date of Patent: Nov. 10, 2026

(54) RETAINING DEVICE FOR SECURING WOOD TO A SAW MILL

(71) Applicant: David Earl Grant, Brewer, ME (US)

(72) Inventor: David Earl Grant, Brewer, ME (US)

( * ) Notice: Subject to any disclaimer, the term of this patent is extended or adjusted under 35 U.S.C. 154(b) by 0 days.

(21) Appl. No.: 19/398,653

(22) Filed: Nov. 24, 2025

(65) Prior Publication Data

US 2026/0077534 A1 Mar. 19, 2026

Related U.S. Application Data

(63) Continuation-in-part of application No. 18/827,285, filed on Sep. 6, 2024, now Pat. No. 12,508,733.

(51) Int. Cl.
*B27B 29/02* (2006.01)
*B27B 1/00* (2006.01)

(52) U.S. Cl.
CPC ................ *B27B 29/02* (2013.01); *B27B 1/00* (2013.01)

(58) Field of Classification Search
CPC .................................. B27B 29/02; B27B 1/00
See application file for complete search history.

(56) References Cited

U.S. PATENT DOCUMENTS

| | | | | | |
|---|---|---|---|---|---|
| 5,109,899 | A * | 5/1992 | Henderickson | B27B 31/04 | 83/884 |
| 5,243,888 | A * | 9/1993 | Bowlin | B27B 15/00 | 83/810 |
| 6,775,917 | B1 * | 8/2004 | Campbell | B27B 25/10 | 83/435.14 |
| 8,695,652 | B1 * | 4/2014 | Pattullo | B27B 1/00 | 269/131 |
| 10,710,817 | B2 * | 7/2020 | Rothwell | B27M 1/08 | |
| 11,267,158 | B1 * | 3/2022 | Kilgore | B27C 7/00 | |
| 12,508,733 | B1 * | 12/2025 | Grant | B27B 1/00 | |
| 2006/0179982 | A1 * | 8/2006 | Fenton | B27B 25/08 | 83/13 |
| 2018/0056461 | A1 * | 3/2018 | Smith | B27B 29/02 | |
| 2022/0288805 | A1 * | 9/2022 | Wallace | B27B 15/02 | |

* cited by examiner

*Primary Examiner* — Omar Flores Sanchez
(74) *Attorney, Agent, or Firm* — Anthony D. Pellegrini

(57) ABSTRACT

The present invention discloses a system for retaining a piece of wood onto a saw mill in an orientation at an angle to the horizontal, such that horizontal cuts made to the wood result in shorter planks with full exposure of wood end grain, displaying the growth rings of the tree.

12 Claims, 8 Drawing Sheets

RETAINING DEVICE FOR SECURING WOOD TO A SAW MILL

CROSS REFERENCE TO RELATED APPLICATIONS

This application claims the benefit of non-provisional application, U.S. Ser. No. 18/827,285, filed Sep. 6, 2024, entitled RETAINING DEVICE FOR SECURING WOOD TO A SAW MILL, by Grant, David E., and currently pending, and to provisional application, U.S. Ser. No. 63/458,368, filed Apr. 10, 2023 (now expired), entitled RETAINING DEVICE FOR SECURING WOOD TO A SAW MILL, by Grant, David E., both of which are hereby incorporated by reference.

BACKGROUND OF THE INVENTION

The present invention relates to saw mills, and more particularly, to accessories for saw mills. Saw mills are well known in the industry. They are used to convert raw wood into lumber by cutting off outer portions of logs such that the resulting cut wood has regular surfaces and lengths. One design of saw mill comprises a pair of horizontally oriented parallel rails and a horizontally oriented cutting saw. The cutting saw may be any type of saw or cutting device used in the industry to cut wood, such as a band saw. The cutting saw is positioned above the rails and is mounted on a carriage which moved along the rails. A piece of wood—either a raw log or a partially cut piece of wood—is placed onto the saw mill between the rails, in an orientation parallel to the rails, and the cutting saw is moved into and along an upper portion of the piece of wood, cutting off said upper portion. A generally cylindrical log will be cut four times, with a 90 degree rotation after each cut, resulting in a piece of wood having a rectangular cross section. Further cuts may be made to the partially cut piece of wood, resulting in planks being made.

While the formation of rectangular planks from pieces of wood is the traditional use of saw mills, there are other finished products that are quite valuable but up to now could not be made using saw mills. For example, flooring, cabinetry, tabletops, and the like are often fashioned by fitting together small geometric pieces of wood into aesthetically pleasing designs. These geometric pieces of wood would have to be fashioned using jigsaws or other precise cutting devices, entailing much time and expense. The present invention seeks to take advantage of the efficiency of a saw mill to create geometric pieces of wood quickly and cost effectively.

The present invention discloses a system for retaining the piece of wood onto the saw mill in an orientation at an angle to the horizontal. Such an orientation causes the horizontal cuts made by the cutting saw to form shorter planks with a greater exposure of wood grain, displaying the growth rings of the tree and elongating those growth rings to form aesthetically pleasing designs. It also creates elongated shapes of the resulting planks. For example, a piece of wood fashioned into a piece of lumber having a square cross section will, when oriented at an angle to the horizontal, result in elongated diamond shaped planks. The steeper the angle, the squatter the diamonds. Similarly, pieces of wood with other polygonal cross sections will yield elongate hexagons, pentagons, octagons, and the like. These geometric shapes are ideal for creating flooring, cabinetry, tabletops, and other wood-surfaced products having an intricate, interlocking appearance, displaying the growth rings of the tree. Moreover, the end grain of a log is five times stronger in compression than the side grain of a log; thus, processing a log as described herein significantly reduces cupping as the material dries.

The present invention also discloses a system for fashioning pieces of wood into lumber having specific polygonal cross sections, to be used with the above-described system. This system uses the same saw mill and cutting saw as described above, but allows for rotation of the piece of wood other than strictly 90 degrees (though 90 degree rotations are also contemplated). Thus, a piece of wood intended to be fashioned into lumber having a hexagonal cross section will be rotated 60 degrees after each horizontal cut of the cutting saw. A piece of wood intended to be fashioned into lumber having a triangular cross section will be rotated 120 degrees after each horizontal cut of the cutting saw. And so on. Using this embodiment provides the specific shaped lumber to be used to cut the short elongated shaped planks as described above.

Specific methods for using the aforementioned embodiments are also described and claimed.

It is therefore shown that a novel method of cutting pieces of wood on existing saw mills results in new and useful product to be used for finished wood-surfaced items.

It is therefore an object of the present invention to provide an attachment to a saw mill that allows for a piece of wood to be cut while oriented at an angle to the horizontal.

It is a further object of the present invention to provide an attachment to a saw mill that allows for a piece of wood to be fashioned into lumber having a polygonal cross section.

It is yet a further object of the present invention to provide methods for operating the attachments to the saw mill to achieve the above-stated objects.

Other objects of the present invention will be readily apparent from the description that follows.

SUMMARY

The present invention discloses a system of attachments that can be added to a saw mill having a pair of rails and a horizontally oriented cutting saw. The system is comprised of a support carriage configured to retain a piece of wood in an orientation that is angled to the horizontal. The support carriage is positionable, so that the angle to the horizontal may be adjusted as desired, to produce differently shaped resultant planks. After one or more cuts are made to the piece of wood by the cutting saw, the remaining portion of the piece of wood is moved up the support carriage so that additional cuts may be made. The support carriage may comprise rollers and guides to assist with the repositioning of the piece of wood.

The present invention also discloses a system of attachments that can be added to a saw mill that comprises a pair of engagement devices. The engagement devices are attached to cross members of the saw mill and are spaced apart from each other. Each engagement device has a vertical orientation relative to the saw mill. A piece of wood is placed between the two engagement devices and secured thereto, such that the cutting saw of the saw mill can pass over the top portion of the piece of wood and make a horizontal cut. The attachment mechanisms of the two engagement devices rotate, allowing the piece of wood to be rotated precisely between cuts. The first engagement device comprises means for positioning and then locking the piece of wood into the desired orientation in anticipation of a cut. A piece of wood intended to have a pentagonal cross section, for example, will be secured between the two engagement devices and locked into place, with the cutting saw making a first cut. Then the first engagement device is unlocked, the piece of wood is rotated 72 degrees, and the first engagement device is relocked. A second cut is made. The piece of wood is rotated three more times, each time by 72 degrees, and cut by the cutting saw. Then end result is a piece of lumber having a pentagonal cross section. Different polygonal and irregular polygonal cross sections can be made by choosing different sequences of positioning and rotation of the piece of wood.

In addition to the attachments to the saw mill, the present invention also discloses methods of using the attachments to create finished product. In one embodiment, the method involves procuring the saw mill attachments as described above, installing the pair of engagement devices onto the saw mill, fashioning the piece of wood as desired, removing the piece of wood and the engagement devices from the saw mill, attaching the support carriage to the saw mill and positioning it as desired, placing the fashioned piece of lumber onto the support carriage and securing it thereto, and making a series of cuts to the piece of lumber with the cutting saw to create finished product. If prefashioned lumber is used, the first several steps of the method may be skipped, and the method begins with installing the support carriage. If the final product is a shaped piece of lumber, the final steps of the method may be skipped, with the method ending after all desired cuts to the piece of wood have been made and the piece of wood and the engagement devices are removed from the saw mill.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DETAILED DESCRIPTION OF THE INVENTION

Figure 1A:
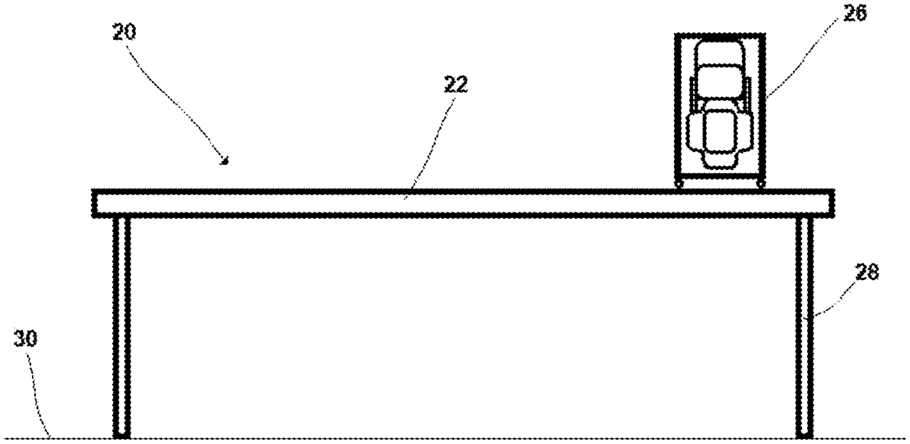
FIG. 1A is a side view of a typical saw mill having pair of horizontally oriented parallel rails and a horizontally oriented cutting saw.
Figure 1B:
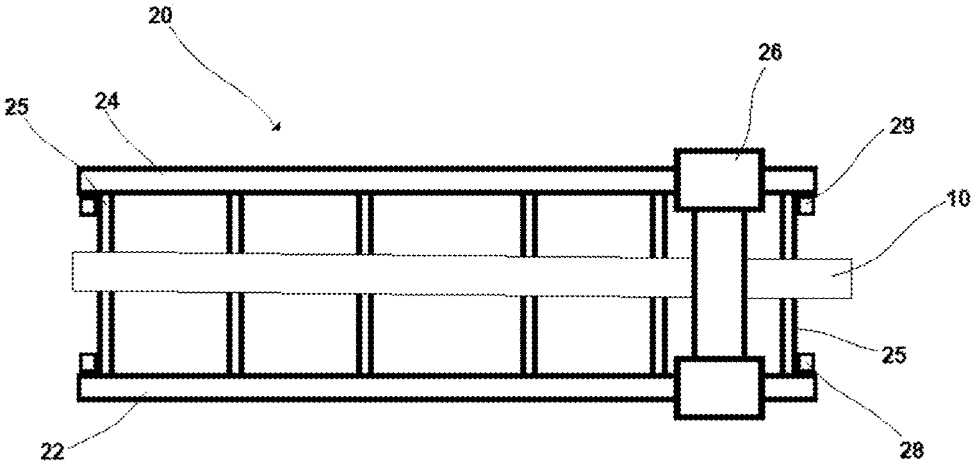
FIG. 1B is a top view of the saw mill shown in FIG. 1A, depicted with a piece of wood placed thereon.

The present invention discloses a retaining device for securing a piece of wood 10 to a saw mill 20. The saw mill 20 must be configured with a cutting saw 26, a first rail 22 and a second rail 24, with the first and second rails 22,24 spaced apart and oriented parallel to each other and both being horizontally oriented, a first support leg 28 and a second support leg 29 spaced apart and oriented parallel to each other and perpendicular to the first and second rails 22,24 and both being vertically oriented, and a plurality of cross members 25, with each of the plurality of cross members 25 running between the first and second rails 22,24 and attached thereto, said cross members 25 oriented substantially perpendicular to said rails 22,24. See FIGS. 1A and 1B. The cutting saw 26 is horizontally oriented and is positioned above the first and second rails 22,24 . A piece of wood 10 (typically a log) is placed horizontally onto the saw mill 20 between the first and second rails 22,24 and the cutting saw 26 is moved horizontally into an end of the piece of wood 10 and then through the piece of wood 10, cutting a slice from the upper portion of the piece of wood 10 and leaving a planar surface on the remaining portion of the piece of wood 10.

Figure 2:
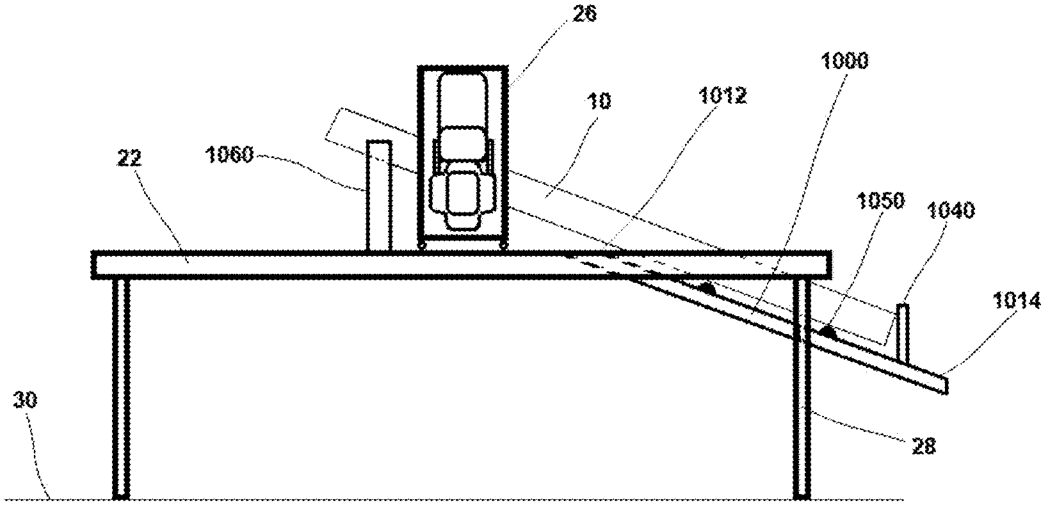
FIG. 2 is a side view of another embodiment of the present invention, depicting the retaining device comprised of a support carriage and clamping member, with a piece of wood retained by the retaining device at an angle to the horizontal.
Figure 3:
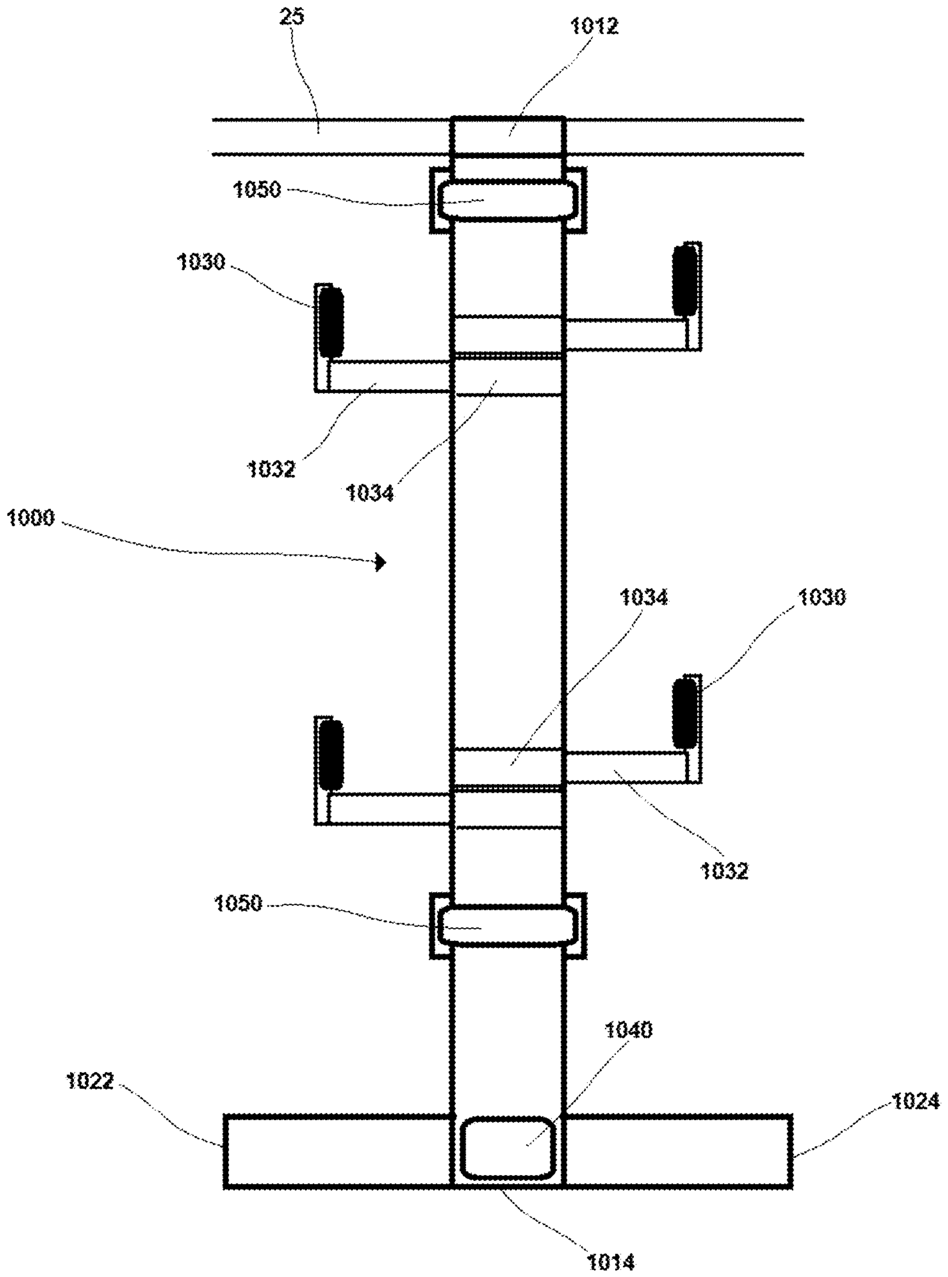
FIG. 3 is a top view of the embodiment of the retaining device depicted in FIG. 3, showing the support carriage.
Figure 7:
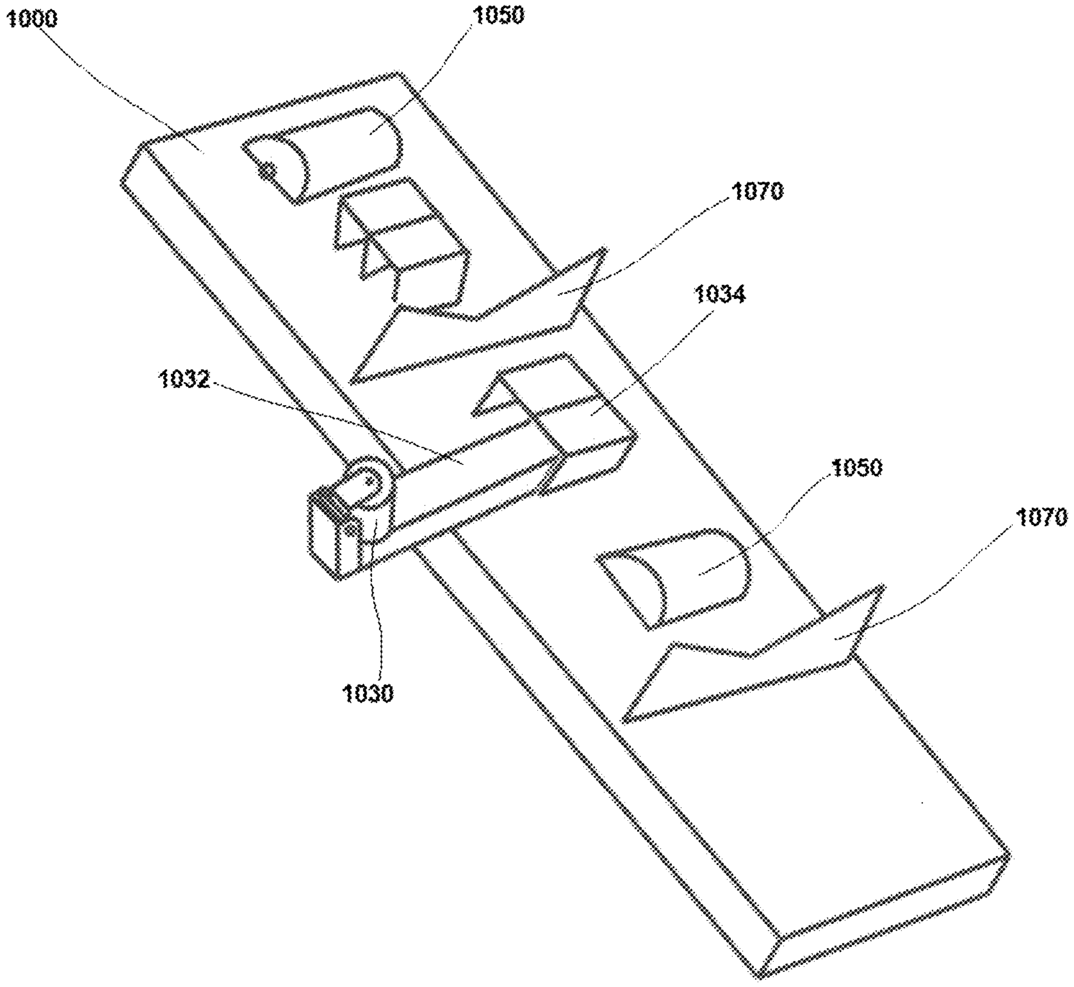
FIG. 7 is a perspective top view of the embodiment of the support carriage with a cradle attached thereto.

In one embodiment, the retaining device comprises a support carriage 1000. The support carriage 1000 is elongate and rigid, and is configured to support a piece of wood 10. See FIGS. 2, 3, and 7. The support carriage 1000 is pivotally attached at its first end 1012 to one of the cross members 25 of the saw mill 20. In one embodiment, the second end 1014 of the support carriage 1000 is placed onto a surface 30, such as a floor or the ground. Because the surface 30 is positioned lower than the cross member 25, the support carriage 1000 is oriented at an angle to the horizontal. When a piece of wood 10 is placed onto the support carriage 1000, the piece of wood 10 is likewise held at an angle to the horizontal. To change the angle of the support carriage 1000 in this embodiment, one or more shims may be placed between the second end 1014 of the support carriage 1000 and the surface 30. The more shims that are interposed between the second end 1014 of the support carriage 1000 and the surface 30, the shallower the angle of the support carriage 1000 to the horizontal will be.

In another embodiment, the second end 1014 of the support carriage 1000 is removably attached to a lower portion of the saw mill 20. See FIG. 2. Because the lower portion of the saw mill 20 is positioned lower than the cross member 25, the support carriage 1000 is oriented at an angle to the horizontal. Repositioning the second end 1014 of the support carriage 1000 upward or downward on the lower portion of the saw mill 20 allows the degree of the angle of the support carriage 1000 to the horizontal to be modified as desired. In one embodiment, the lower portion of the saw mill 20 is the first support leg 28 of the saw mill 20 and the second support leg 29 of the saw mill 20. The first side of the support carriage 1000 located proximate to the second end 1014 of the support carriage 1000 is removably attached to the first support leg 28 of the saw mill 20, and the second side of the support carriage 1000 located proximate to the second end 1014 of the support carriage 1000 is removably attached to the second support leg 29 of the saw mill 20. To change the angle of the support carriage 1000 in this embodiment, the second end 1014 of the support carriage 1000 is repositioned along the first and second legs 28,29 of the saw mill 20, such that when the second end 1014 of the support carriage 1000 is positioned higher along the first and second legs 28,29 of the saw mill 20, the shallower the angle of the support carriage 1000 will be, and when the second end 1014 of the support carriage 1000 is positioned lower along the first and second legs 28,29 of the saw mill 20, the steeper the angle of the support carriage 1000 will be. The second end 1014 of the support carriage 1000 may be removably secured to the first and second legs 28,29 of the saw mill 20 by a plurality of pins placed through apertures formed in the sides of the support carriage 1000 and through a series of vertically spaced apart apertures formed in the first and second legs 28,29 of the saw mill 20. Alternatively, the second end 1014 of the support carriage 1000 may be removably secured to the first and second legs 28,29 of the saw mill 20 by a pair of clamps, one clamp located on each of the first and second sides of the support carriage 1000, with each clamp configured to be secured to one of the first and second legs 28,29 of the saw mill 20. Other means for removably securing the second end 1014 of the support carriage 1000 to the first and second legs 28,29 of the saw mill 20 are also contemplated.

In preferred embodiments of the support carriage 1000, there are one or more laterally oriented central rollers 1050. See FIG. 3. The piece of wood 10 is placed onto the one or more central rollers 1050, facilitating movement of the piece of wood 10 along the support carriage 1000. The one or more central rollers 1050 may be made of metal, wood, plastic, rubber, or other materials. Each central roller 1050 has an axel about which the central roller rotates, with said axel being affixed to the support carriage 1000.

In yet another embodiment of the support carriage 1000, there are a plurality of laterally oriented guide rollers 1030. See FIG. 3. The piece of wood 10 is supported by the support carriage 1000 by being placed onto the plurality of guide rollers 1030. Preferably, there are an equal number of guide rollers 1030 located on either side of the support carriage 1000, such that the piece of wood 10 is supported between pairs of guide rollers 1030. Each guide roller 1030 is mounted on a lateral arm 1032 which is attached to the support carriage 1000. The one or more guide rollers 1030 may be made of metal, wood, plastic, rubber, or other materials. Each guide roller 1030 has an axel about which the guide roller 1030 rotates, with said axel being affixed to the corresponding lateral arm 1032. In the most preferred embodiments, the lateral arms 1032 may be moveably attached to the support carriage 1000 such that each lateral arm 1032 is capable of being repositioned laterally with respect to the support carriage 1000, thereby allowing for differing distances between pairs of guide rollers 1030 in order to accommodate different diameters of the piece of wood 10 placed therebetween. In one embodiment, the lateral arm 1032 of the guide roller 1030 is fitted into a lateral sleeve 1034 attached to the support carriage 1000, with the lateral arm 1032 moveably positionable within the lateral sleeve 1034, and there further being a means for fixing the position of the lateral arm 1032 within the lateral sleeve 1034, such as a locking pin, a clamp, or any other mechanism known in the art.

In other embodiments, there is a stop member 1040 removably attached to the support carriage 1000 behind the piece of wood 10. See FIG. 3. As the piece of wood 10 is slid upwards along the support carriage 1000, the stop member 1040 is repositioned against the back of the piece of wood 10 to prevent it from sliding backwards. The stop member 1040 may be removably secured to the support carriage 1000 by any appropriate means, including, for example, by a pair of pins extending downward into a series of apertures formed into the sides of the support carriage 1000. Alternatively, the stop member 1040 may be removably secured to the support carriage 1000 by a pair of clamps, one clamp located on each side of the stop member 1040 and configured to grip one of the sides of the support carriage 1000. Other means for removably securing the stop member 1040 to the support carriage 1000 are also contemplated.

Figure 4A:
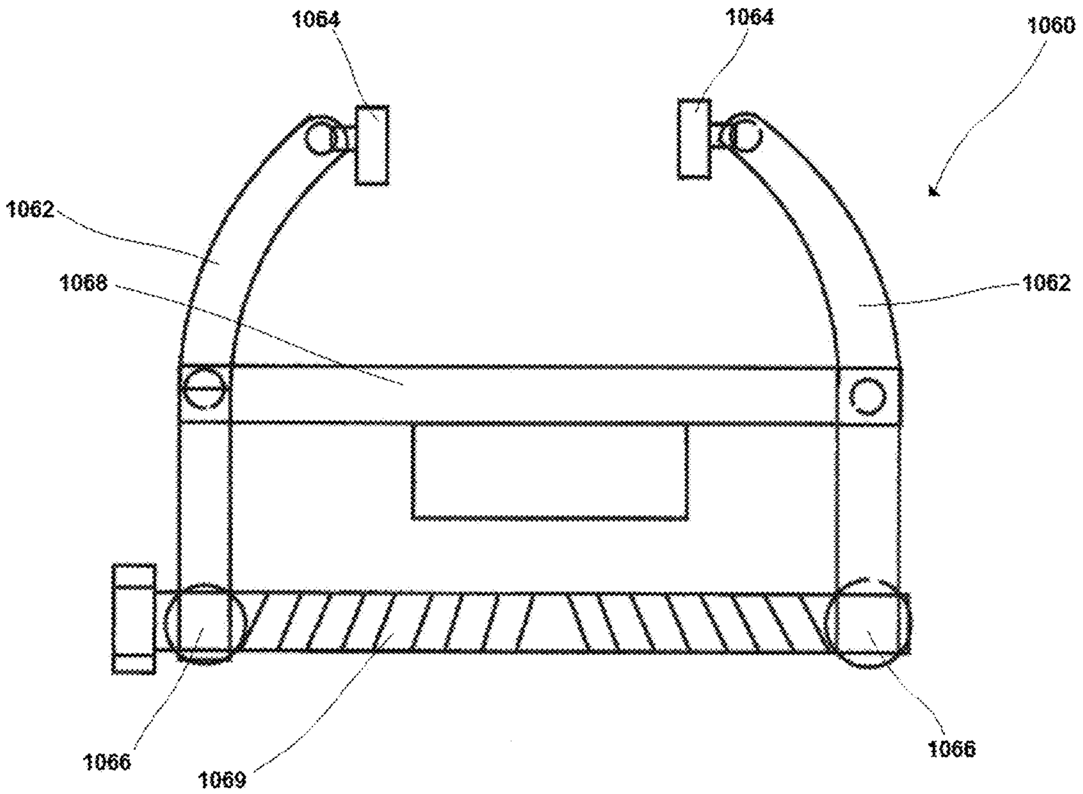
FIG. 4A is a plan front view of one embodiment of a clamping member of the retaining device.
Figure 4B:
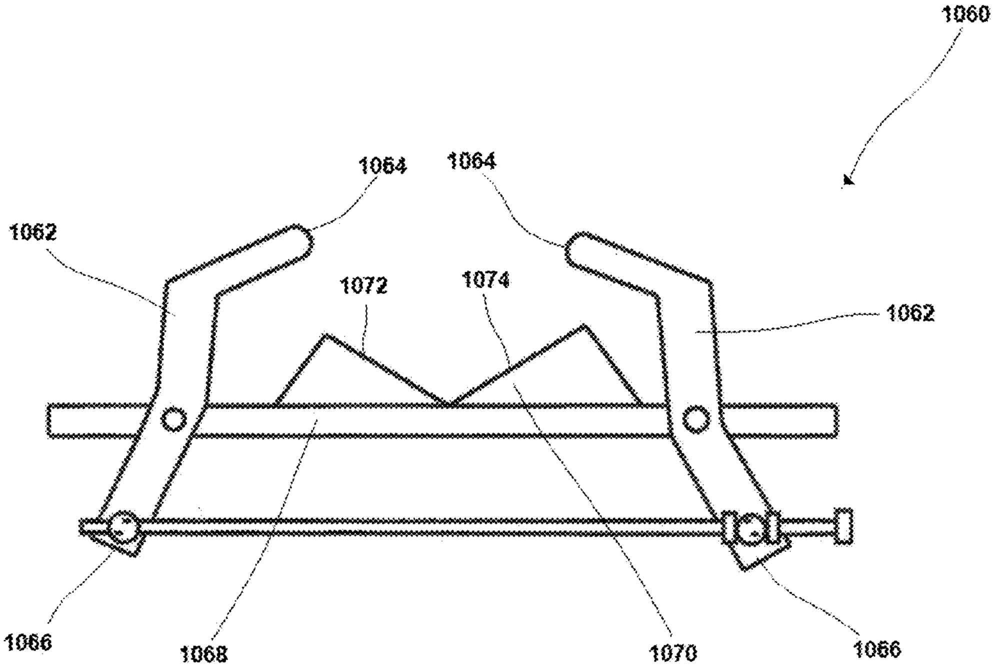
FIG. 4B is a plan front view of another embodiment of a clamping member of the retaining device.
Figure 5:
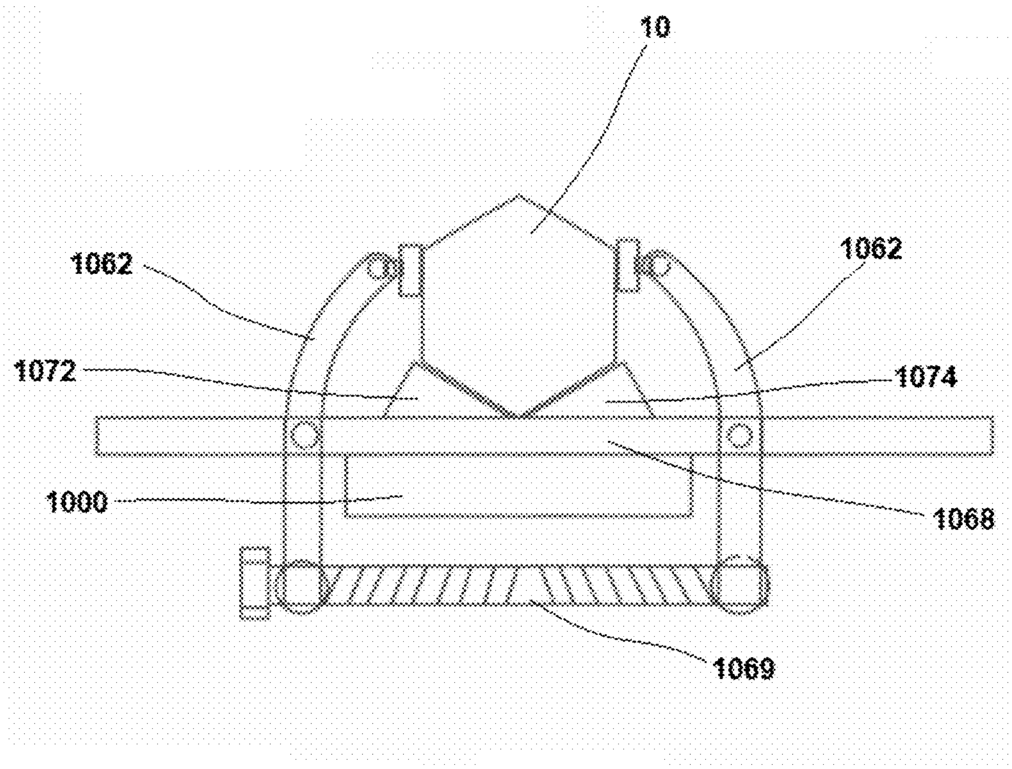
FIG. 5 is a plan front view of another embodiment of a clamping member of the retaining device having a cradle attached thereto.

In another embodiment of the present invention, the support carriage 1000 further comprises one or more clamping members 1060. See FIGS. 4A, 4B, and 5. Each clamping member 1060 is configured to secure the piece of wood 10 to the support carriage 1000. In one embodiment, the clamping member 1060 has a pair of clamping arms 1062 which may be brought together or spread apart. The clamping arms 1062 are joined to a lateral cross piece 1068. The clamping member 1060 is placed onto the support carriage 1000 with the cross piece 1068 placed against the upper side of the support carriage 1000, and then the clamping arms 1062 are brought together until they contact the piece of wood 10 that has been placed onto the support carriage 1000. In one embodiment, the clamping arms 1062 are pivotally attached to either end of the cross piece 1068, and the distal (non-clamping) ends 1066 of the clamping arms 1062 are joined together by a threaded rod 1069, which is located below the support carriage 1000. Rotation of the threaded rod 1069 in one direction moves the distal ends 1066 of the clamping arms 1062 towards each other, thereby simultaneously moving the clamping ends 1064 of the clamping arms 1062 away from each other, allowing the piece of wood 10 to be placed between or removed from the clamping member 1060, while rotation of the threaded rod 1069 in the opposite direction moves the distal ends 1066 of the clamping arms 1062 away from each other, thereby simultaneously moving the clamping ends 1064 of the clamping arms 1062 towards each other and into the piece of wood 10, thereby clamping it securely to the support carriage 1000.

Figure 6:
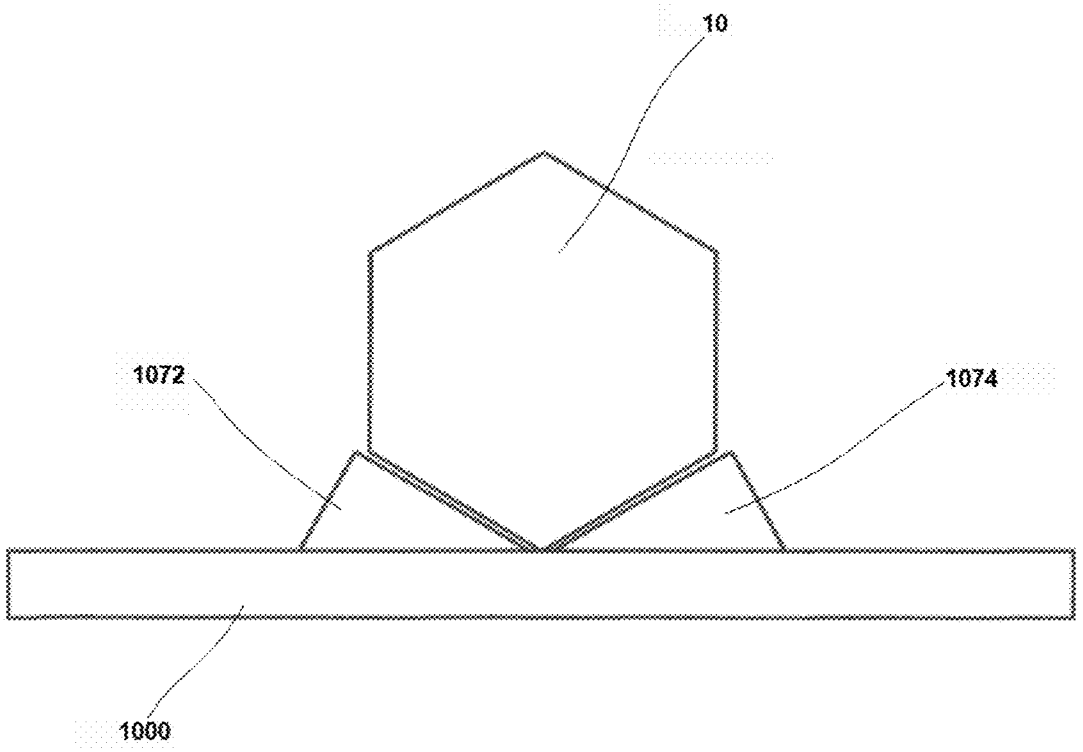
FIG. 6 is a plan side view of an embodiment of the support carriage with a cradle attached thereto.

In yet another embodiment, the support carriage 1000 may comprise a plurality of cradles 1070 shaped to accommodate a piece of wood 10 cut with a polygonal (either regular or irregular) cross section. See FIGS. 6 and 7. Each such cradle 1070 will have the same configuration as each other cradle 1070. Each cradle 1070 is comprised of a first cradle member 1072 and a second cradle member 1074, with the first and second cradle members 1072,1074 being located adjacent to and aligned laterally to each other, with each of first and second cradle members 1072,1074 being angled to the vertical in equal but opposite directions, whereby the lower portions of the first and second cradle members 1072,1074 are positioned closer to each other than upper portions of the first and second cradle members 1072,1074. The angle of the first and second cradle members 1072,1074 may be configured to accommodate differently shaped pieces of wood 10. For example, if the piece of wood 10 has a square cross section, the first and second cradle members 1072,1074 will each be at a forty-five degree angle to the vertical. If the piece of wood 10 has a pentagonal cross section, the first and second cradle members 1072,1074 will each be at a fifty-four degree angle to the vertical. If the piece of wood 10 has a hexagonal cross section, the first and second cradle members 1072,1074 will each be at a sixty degree angle to the vertical. If the piece of wood 10 has an octagonal cross section, the first and second cradle members 1072,1074 will each be at a sixty-seven and a half degree angle to the vertical. Other polygonal cross sections (regular and irregular) may be accommodated by differently configured cradles 1070.

The angle of the first and second cradle members 1072, 1074 may be embodied as a thin edge of the respective first and second cradle members 1072,1074. The edges of the respective first and second cradle members 1072,1074 face each other. Alternatively, the angle of the first and second cradle members 1072,1074 may be embodied as a broad, substantially planar face of the respective first and second cradle members 1072,1074. The faces of the respective first and second cradle members 1072,1074 face each other.

In yet another embodiment, the clamping member 1060 described above may comprise a cradle 1070 as described above, with said cradle 1070 positioned onto the cross piece 1068 of the clamping member 1060. See FIGS. 4B and 5.

Modifications and variations can be made to the disclosed embodiments of the present invention without departing from the subject or spirit of the invention as defined in the following claims.

I claim:

1. A retaining device for securing a piece of wood to a saw mill, said saw mill comprising a cutting saw, a first rail, a second rail, and one or more cross members, with said first and second rails spaced apart and oriented parallel to each other, said first and second rails being horizontally oriented, each of the one or more cross members running between the first and second rails and attached thereto and with each of the one or more cross members oriented substantially perpendicular to said rails, and said cutting saw positioned above said first and second rails, with said saw mill configured to be placed onto a surface, said retaining device comprising a support carriage, said support carriage being elongate and rigid, with said support carriage being oriented perpendicular to one of the one or more cross members, said cross member being located proximate to an end of the saw mill, said support carriage being pivotally attached to said cross member, with said support carriage configured to support the piece of wood thereon, and further configured to be pivoted downward;

wherein the support carriage has a first end and a second end, with the first end of the support carriage pivotally attached to said cross member and the second end of the support carriage configured to be placed onto the surface, whereby said surface is positioned lower than the first end of the support member, such that when the piece of wood is placed onto the support carriage the piece of wood is held at an angle to a plane oriented substantially horizontally to the surface.

2. A retaining device for securing a piece of wood to a saw mill, said saw mill comprising a cutting saw, a first rail, a second rail, and one or more cross members, with said first and second rails spaced apart and oriented parallel to each other, said first and second rails being horizontally oriented, each of the one or more cross members running between the first and second rails and attached thereto and with each of the one or more cross members oriented substantially perpendicular to said rails, and said cutting saw positioned above said first and second rails, with said saw mill configured to be placed onto a surface, said retaining device comprising a support carriage, said support carriage being elongate and rigid, with said support carriage being oriented perpendicular to one of the one or more cross members, said cross member being located proximate to an end of the saw mill, said support carriage being pivotally attached to said cross member, with said support carriage configured to support the piece of wood thereon, and further configured to be pivoted downward;

wherein the support carriage has a first end and a second end, with the first end of the support carriage pivotally attached to said cross member and the second end of the support carriage removably attached to a lower portion of the saw mill, whereby said lower portion of the saw mill is positioned lower than the first end of the support member, such that when the piece of wood is placed onto the support carriage the piece of wood is held at an angle to a plane oriented substantially horizontally to the surface.

3. The retaining device of claim 2 wherein the second end of the support carriage is removably attached to a plurality of locations on the lower portion of the saw mill.

4. The retaining device of claim 2 wherein the saw mill further comprises a first support leg and a second support leg, with the first support leg attached to the first rail and oriented substantially perpendicular to the first rail, and the second support leg attached to the second rail opposite the first support leg and oriented substantially perpendicular to the second rail, wherein the support carriage has a first side and a second side, with the first side of the support carriage located proximate to the second end of the support carriage being removably attached to the first support leg of the saw mill, and the second side of the support carriage located proximate to the second end of the support carriage being removably attached to the second support leg of the saw mill, whereby the second end of the support carriage is positioned lower than the first end of the support member.

5. The retaining device of claim 4 wherein the first side of the support carriage located proximate to the second end of the support carriage is removably attached to a plurality of locations along the first support leg of the saw mill, and the second side of the support carriage located proximate to the second end of the support carriage is removably attached to a plurality of locations along the second support leg of the saw mill.

6. The retaining device of claim 2 wherein the support carriage further comprises a stop member, with said stop member being attached to the support carriage such that the piece of wood placed onto the support carriage rests against the stop member.

7. The retaining device of claim 6 wherein the stop member of the support carriage is configured to be removably attached to the support carriage at a plurality of locations along the support carriage.

8. The retaining device of claim 2 wherein the support carriage further comprises one or more clamping members, with each clamping member configured to secure the piece of wood to the support carriage.

9. A retaining device for securing a piece of wood to a saw mill, said saw mill comprising a cutting saw, a first rail, a second rail, and one or more cross members, with said first and second rails spaced apart and oriented parallel to each other, said first and second rails being horizontally oriented, each of the one or more cross members running between the first and second rails and attached thereto and with each of the one or more cross members oriented substantially perpendicular to said rails, and said cutting saw positioned above said first and second rails, said retaining device comprising a support carriage, said support carriage being elongate and rigid, with said support carriage being oriented perpendicular to one of the one or more cross members, said cross member being located proximate to an end of the saw mill, said support carriage being pivotally attached to said cross member, with said support carriage configured to support the piece of wood thereon, and further configured to be pivoted downward;

wherein the support carriage further comprises one or more clamping members, with each clamping member configured to secure the piece of wood to the support carriage, and each clamping member comprises a first clamping arm, a second clamping arm, a lateral cross piece, and a threaded rod, with each of the first and second clamping arms having a clamping end, a middle portion, and a distal end, the lateral cross piece having a first end, a second end, and a middle portion, and the threaded rod having a first end, a second end, first threads located proximate to the first end of the threaded rod, and second threads located proximate to the second end of the threaded rod, with the first threads having a reverse orientation from the second threads;

wherein the middle portion of the first clamping arm is pivotally attached to the lateral cross piece at a location proximate to the first end of the lateral cross piece, the middle portion of the second clamping arm is pivotally attached to the lateral cross piece at a location proximate to the second end of the lateral cross piece, the first end of the threaded rod is threaded through the distal end of the first clamping arm, the second end of the threaded rod is threaded through the distal end of the second clamping arm, and the lateral cross piece is secured to the support carriage;

whereby when the threaded rod is rotated in a first direction, the distal ends of the first and second clamping arms are brought closer together resulting in the clamping ends of the first and second clamping arms being moved away from each other, and when the threaded rod is rotated in a second direction opposite the first direction, the distal ends of the first and second clamping arms are moved away from each other resulting in the clamping ends of the first and second clamping arms being moved closer together.

10. The retaining device of claim 9 wherein each clamping member further comprises a cradle, said cradle comprised of a first cradle member and a second cradle member, with the first and second cradle members being placed onto the lateral cross piece of the clamping member and located adjacent to each other, with each of first and second cradle members being angled to the vertical in equal but opposite directions;

whereby an upper portion of the first cradle member is located a first distance from an upper portion of the second cradle member and a lower portion of the first cradle member is located a second distance from a lower portion of the second cradle member such that the first distance is greater than the second distance.

11. The retaining device of claim 10 wherein the first cradle member is configured such that the angle of the first cradle member is embodied in an edge of the first cradle member, and the second cradle member is configured such that the angle of the second cradle member is embodied in an edge of the second cradle member, whereby the edge of the first cradle member faces the edge of the second cradle member.

12. The retaining device of claim 10 wherein the first cradle member is configured such that the angle of the first cradle member is embodied in a planar face of the first cradle member, and the second cradle member is configured such that the angle of the second cradle member is embodied in a planar face of the second cradle member, whereby the face of the first cradle member faces the face of the second cradle member.

* * * * *